Sept 17, 1957 S. FOX 2,806,325
COMBINATION FLOWER STEM STRIPPER AND CUTTER
Filed Nov. 25, 1953

Inventor
Sol Fox
By Clarence E. Threedy
His Attorney

United States Patent Office 2,806,325
Patented Sept. 17, 1957

2,806,325

COMBINATION FLOWER STEM STRIPPER AND CUTTER

Sol Fox, Chicago, Ill., assignor to Koppoware Products Mfg. Co., Chicago, Ill., a copartnership consisting of Sol Fox and Esther Fox Application November 25, 1953, Serial No. 394,382

2 Claims. (Cl. 47—1)

This invention relates to certain new and useful improvements in a combination flower stem stripper and cutter.

The invention is especially designed for use by florists and gardeners to strip leaves, thorns, and short branches from the stems of flowers, for example, roses or the like.

Viewed in this light, the invention has for its principal object the provision of a stripper and cutter which will be simple in construction, easy of manipulation, and economical in manufacture.

Another and equally important object of the invention is to provide a tool of the character hereinafter described wherein there are incorporated in the forward end portion of the tool cooperating jaws which are adapted to embrace the flower stem for stripping the leaves and thorns therefrom, while within the confines of the tool inwardly of the forward end portion is arranged a pair of cutters cooperating to sever the stem at a predetermined point after the stripping operation, whereby the stripping and severing of the stem may be easily, conveniently, and expeditiously accomplished through the use of one tool.

Other objects will appear hereinafter.

The invention consists in the novel combination and arrangement of parts to be hereinafter described and claimed.

The invention will be best understood by reference to the accompanying drawings showing the preferred form of construction, and in which.

Figures 1, 2, 3:
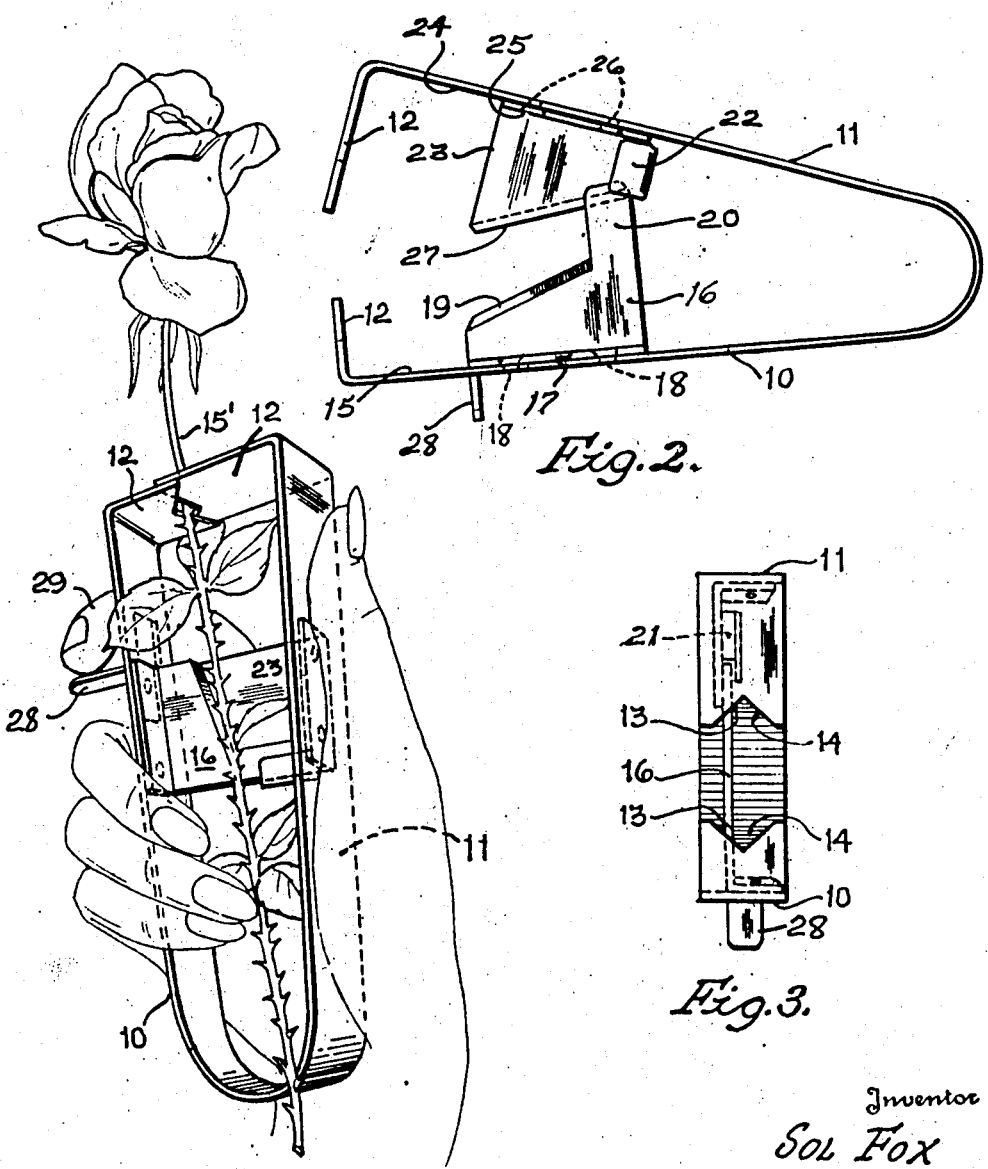
Fig. 1 is a perspective view of the invention showing the same in stripping relation with respect to a flower stem.
Fig. 2 is a side elevational view of the same.
Fig. 3 is a view of the stripping end of the same.

My present invention constitutes an improvement over that shown in my pending application, Serial Number 361,911, now Patent 2,681,504. The present application in effect is a continuation-in-part of the aforesaid pending application.

Referring now more particularly to the drawings, the invention preferably comprises an elongated strip of material formed substantially U-shaped to provide normally spaced apart gripping arms 10 and 11.

These arms 10 and 11 at their free end portions are bent substantially at right angles with respect to each other to provide overlapping stripping jaws 12. These stripping jaws 12 have formed in their overlapping end portion V-shaped notches 13, the edges 14 of which are preferably dull so that when a flower stem or branch 15' is disposed between the jaws 12, only the stripping operation will be effected. As the edges 14 are dull, it is obvious that pressure upon the arms 10 and 11 will not effect a cutting operation of the jaws 12 upon the stem 15'.

Extending laterally from the surface 15 of the arm 10 is a plate 16. This plate 16 has an angularly extending portion 17 which may be screwed or welded as at 18 to the arm 10. The plate 16 provides a diagonal cutting edge 19 and a guide finger 20. The guide finger 20 operates in a guiding groove 21 formed by bending an extension 22 substantially upon a plate 23 of which the extension is a part. This plate 23 extends laterally from the side 24 of the arm 11 and has an angularly bent portion 25 which like the portion 17 is screwed or welded to the arm 11 as at 26.

The plate 23 has a diagonal cutting edge 27 which is adapted to be overlapped by the cutting edge 19 and to cooperate therewith to sever the stripped portion of a flower stem from the remaining portion thereof.

To complete the invention, a finger support 28 is struck out from the arm 10.

When the tool is held in the position shown in Fig. 1 the forefinger 29 of the hand may be braced against or looped about the support 28 for more comfortable and expeditious manipulation of the tool by the user thereof, thus preventing slipping of the tool from the grasp and facilitating flexing of the hand.

Fig. 1 of the drawings illustrates the use and application of my improved tool in stripping action.

By the use of a tool constructed in accordance with the foregoing description, the thorns and leaves of a stem may be first stripped from the stem. Thereafter the stem may be brought between the cutting edges 19 and 27 at an angle with respect to the cutter and be easily and quickly severed from the unstripped portion.

The simplicity of my improved combination flower stem stripper and cutter is made clear from the foregoing description.

The tool may be formed of such material as will best serve the purpose.

It will be apparent that the extension 22 and finger 20 not only serve to guide the movement of the stripper jaws in proper alignment with respect to each other but also serve to guide the movement of the cutting edges when moved into cutting engagement with respect to each other. Such guiding structure prevents any lateral springing of the arms which would otherwise throw the stripper and cutting edges out of alignment.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In combination a flower stem stripper and cutter comprising an elongated strip of material bent substantially U-shaped to provide opposite normally yieldably held apart gripping arms, cooperating jaw elements at the free end of said arms and extending at right angles with respect to said arms with the jaw of one of said arms overlapping the jaw of the other of said arms when said arms are compressed together, said jaw elements having V-shaped stem engaging notches formed therein with the stem engaging edges of said notches substantially dull for stripping purposes, stem cutting members carried by and between said arms and extending longitudinally thereof and transversely with respect to said jaw elements, said cutting members each providing opposite diagonally extending cutting edges, a guide finger for said cutting members and arms extending from one of said cutting members above the diagonal cutting edge thereof and a guiding groove provided by the other of said cutting members below the diagonal cutting edge thereof, said guide finger being of a length so as to engage one of said arms through said groove when said arms are compressed together so as to prevent said V-shaped notches of said jaw elements from over-lapping each other, said cutting members being of such a length so as to have their cutting edges over-lapping each other in cutting relation when said finger engages said arm through said groove.

2. The combination as defined by claim 1 wherein the cutting members together with the guide finger and groove provided thereby as carried by said arms are off-set with respect to said V-shaped notches so as to be out of the path of a stem being stripped.

References Cited in the file of this patent

UNITED STATES PATENTS

| | | |
|---|---|---|
| Re. 14,169 | Aaron | July 25, 1916 |
| 243,629 | Sanderson | June 28, 1881 |
| 594,354 | McCready | Nov. 23, 1897 |
| 1,065,679 | Gregson et al. | June 24, 1913 |
| 1,592,142 | Laubscher | July 13, 1926 |
| 2,167,337 | De Meester | July 25, 1939 |
| 2,232,315 | Craig | Feb. 18, 1941 |
| 2,609,716 | Forman | Sept. 9, 1952 |
| 2,646,621 | Catanese | July 28, 1953 |

FOREIGN PATENTS

| | | |
|---|---|---|
| 289,626 | Great Britain | May 3, 1928 |